(12) United States Patent
Tsirkin et al.

(10) Patent No.: US 12,483,598 B2
(45) Date of Patent: *Nov. 25, 2025

(54) IMPLEMENTING A SERVICE MESH IN THE HYPERVISOR

(71) Applicant: Red Hat, Inc., Raleigh, NC (US)

(72) Inventors: Michael Tsirkin, Westford, MA (US); Francisco Javier Martinez Canillas, Barcelona (ES); Alberto Carlos Ruiz Ruiz, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,022

(22) Filed: Jul. 13, 2023

(65) Prior Publication Data

US 2023/0362203 A1 Nov. 9, 2023

Related U.S. Application Data

(63) Continuation of application No. 16/676,964, filed on Nov. 7, 2019, now Pat. No. 11,729,218.

(51) Int. Cl.
*H04L 29/06* (2006.01)
*G06F 9/455* (2018.01)
*H04L 9/40* (2022.01)
*H04L 61/256* (2022.01)

(52) U.S. Cl.
CPC .......... *H04L 63/20* (2013.01); *G06F 9/45558* (2013.01); *H04L 61/256* (2013.01); *G06F 2009/4557* (2013.01); *G06F 2009/45595* (2013.01)

(58) Field of Classification Search
CPC ..... H04L 63/20; H04L 61/2514; H04L 45/74; H04L 61/2503; G06F 9/45558; G06F 2009/45595; G06F 2009/4557
See application file for complete search history.

(56) References Cited

U.S. PATENT DOCUMENTS

| | | | |
|---|---|---|---|
| 9,819,699 B1 * | 11/2017 | Nenov | ............... H04L 67/60 |
| 2015/0200808 A1 * | 7/2015 | Gourlay | ............ H04L 49/354 |
| | | | 709/225 |
| 2015/0207665 A1 * | 7/2015 | Basso | ............... G06F 21/53 |
| | | | 709/223 |
| 2016/0277355 A1 * | 9/2016 | Shetty | ............. H04L 45/745 |

(Continued)

OTHER PUBLICATIONS

Marcus Schiesser, Comparing Service Meshes: Linkerd vs. Istio, [p. 2], [p. 3], [p. 7].

(Continued)

*Primary Examiner* — Dao Q Ho
(74) *Attorney, Agent, or Firm* — Womble Bond Dickinson (US) LLP (57) ABSTRACT

A packet is received by a hypervisor from a first container, the packet to be provided to a second container, the packet including a header including a first network address associated with the second container. A network policy is identified for the packet in view of the first network address. A second network address corresponding to the second container is determined in view of the network policy. A network address translation is performed by the hypervisor to modify the header of the packet to include the second network address corresponding to the second container.

15 Claims, 8 Drawing Sheets

(56) References Cited

U.S. PATENT DOCUMENTS

| | | | |
|---|---|---|---|
| 2017/0214612 A1* | 7/2017 | Leitner | H04L 49/9036 |
| 2017/0250910 A1* | 8/2017 | Sutter | H04L 61/251 |
| 2018/0181417 A1* | 6/2018 | Nallapareddy | H04L 63/0892 |
| 2018/0295064 A1* | 10/2018 | Movsisyan | G06F 9/45558 |
| 2020/0252376 A1* | 8/2020 | Feng | H04L 67/146 |
| 2021/0144177 A1* | 5/2021 | Tsirkin | G06F 9/45558 |

OTHER PUBLICATIONS

Kublr Team, How to Implement a Service Mesh with Istio, Jul. 2018, [p. 1], [p. 2].

Dr. Rabi Prasad Padhy, Docker Containers and Kubernetes: An Architectural Perspective, Oct. 28, 2018, 10 pages.

* cited by examiner

IMPLEMENTING A SERVICE MESH IN THE HYPERVISOR

RELATED APPLICATIONS

This application is a continuation of U.S. patent application Ser. No. 16/676,964 filed on Nov. 7, 2019, which is herein incorporated by reference in its entirety.

TECHNICAL FIELD

Aspects of the present disclosure relate to a service mesh, and more particularly, to implementing a service mesh in the hypervisor.

BACKGROUND

A service mesh is a way to control how different parts of an application share data with one another. Unlike other systems for managing this communication, a service mesh is a dedicated infrastructure layer. This visible infrastructure layer can document how well different parts of an application interact, so it becomes easier to optimize communication of the application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

On a microservice architecture, an application being developed may be made up of multiple services. Each of these services may be executed within containers that each act as an isolated execution environment for the services. When developing an application, developers of the different services may use different programming languages and/or frameworks. This makes the use of language and/or framework specific solutions to implement features, such as retry, fault tolerance, authentication, service discovery, etc., within the services difficult or, in some cases, impossible.

In a conventional architecture, these features (e.g., retry, fault tolerance, service discovery, etc.) are located in the network layer of the architecture so that the features are available to the different services. The containers that run the different services connect through network proxies that allow access to the features at the network layer. The network proxies are user-space daemons that run as sidecar containers along with the containers that run the different services. This forms a service mesh, where the containers running the different services communicate through network proxies rather than directly with one another.

However, this conventional architecture requires constant management and updating of the network proxies at the network layer. Furthermore, the network proxies cause the deployment of twice the number of containers as each of the network proxies runs as a sidecar container to a container running a service. Additionally, performing management of the network proxies at the network layer of the architecture adds additional latency to the overall system since the management requires context switches between kernel-space and user-space, decreasing the performance of the system.

Aspects of the disclosure address the above-noted and other deficiencies by implementing a service mesh at the hypervisor layer of a system architecture. The containers that run the services of an application may reside within one or more virtual machines that are managed by a hypervisor. The hypervisor may include a hypervisor memory that stores one or more network policies that include network address information for containers running different services for the application. Upon receipt of a communication packet (also referred to as "packet" hereafter) from a first container that is to be sent to a second container, the hypervisor may identify the appropriate network policy for the first container and the second container. Using the identified network policy, the hypervisor may perform a network address translation on the packet to modify the destination address of the packet to the network address of the second container. After performing the network address translation, the packet is provided to the second container.

By implementing the service mesh at the hypervisor level, management of the connections may be performed at the hypervisor level, preventing the use of context switches from user-space to kernel space, reducing latency of the overall system and improving performance. Additionally, by implementing the service mesh at the hypervisor level, the number of containers being deployed is reduced as the sidecar containers of the network proxies are no longer being deployed.

Figure 1:
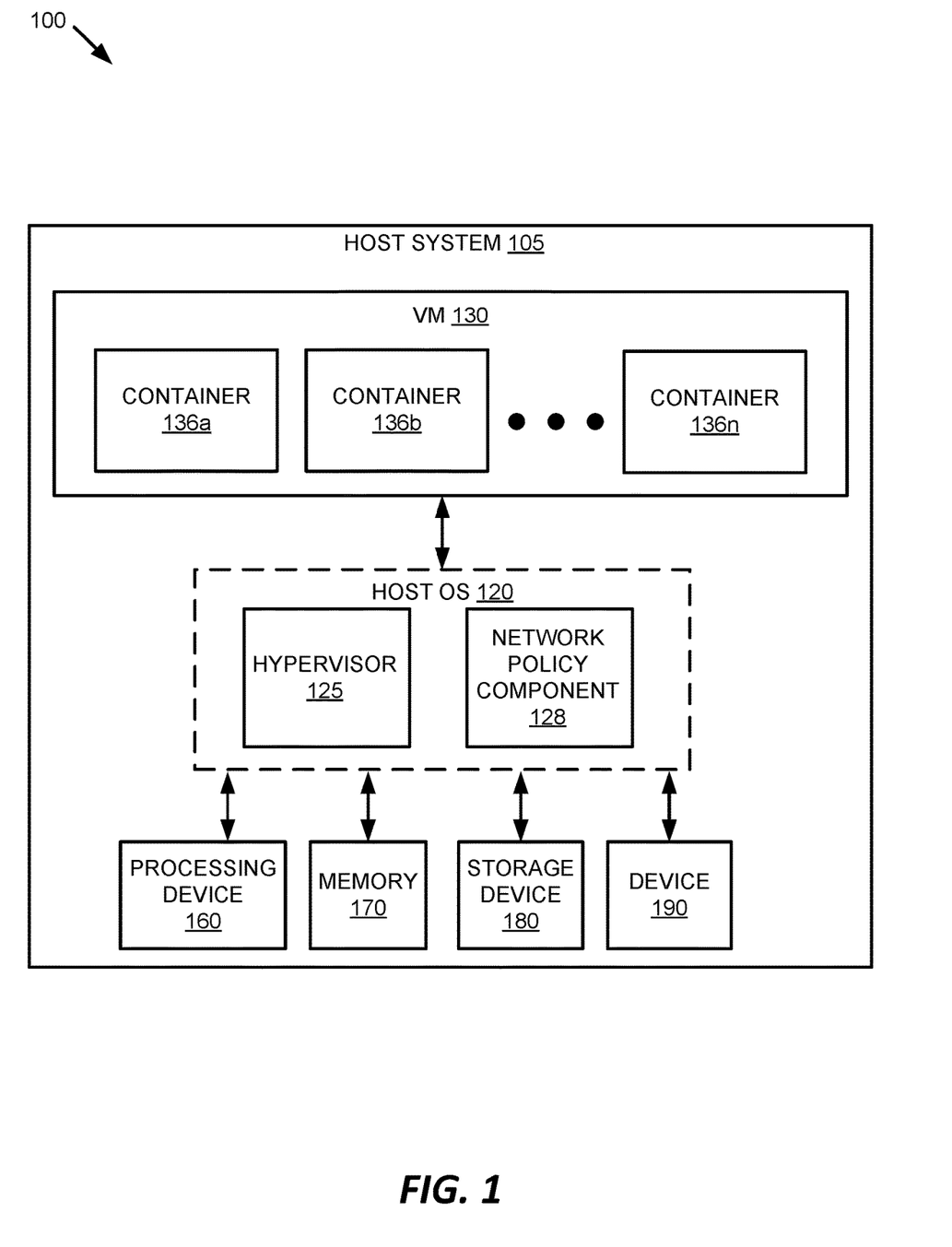
FIG. 1 is a block diagram that illustrates an example data center, in accordance with some embodiments.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a host system 105. The host system 105 includes one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host system 105 may include a plurality of processing devices, storage devices, and devices. The host system 105 may be a server, a mainframe, a workstation, a personal computer (PC), a mobile phone, a palm-sized computing device, etc.

Host system 105 may additionally include one or more virtual machines (VMs) 130 and host operating system (OS) 120. VM 130 is a software implementation of a machine that executes programs as though it was an actual physical machine. The VM 130 may include containers 136*a-n* that each act as isolated execution environments for different services of applications, as previously described. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). Hypervisor 125 may include a network policy component 128. It should be noted that in some alternative implementations, hypervisor 125 may be external to host OS 120, rather than embedded within host OS 120, or may replace host OS 120.

Network policy component 128 can implement a service mesh to facilitate the communication between containers 136*a-n*, as described in detail below with respect to FIGS. 2-7. Network policy component 128 may store and access network policies that include address information, such as network addresses, for containers 136*a-n* that may be used by hypervisor 125 for the translation of network addresses to enable the sending of packets between containers 136*a-n*. In embodiments, the network policies can be stored in an area of hypervisor memory accessible to network policy component 128, a shared memory space, a data structure saved in storage device 180, or the like.

Figure 2:
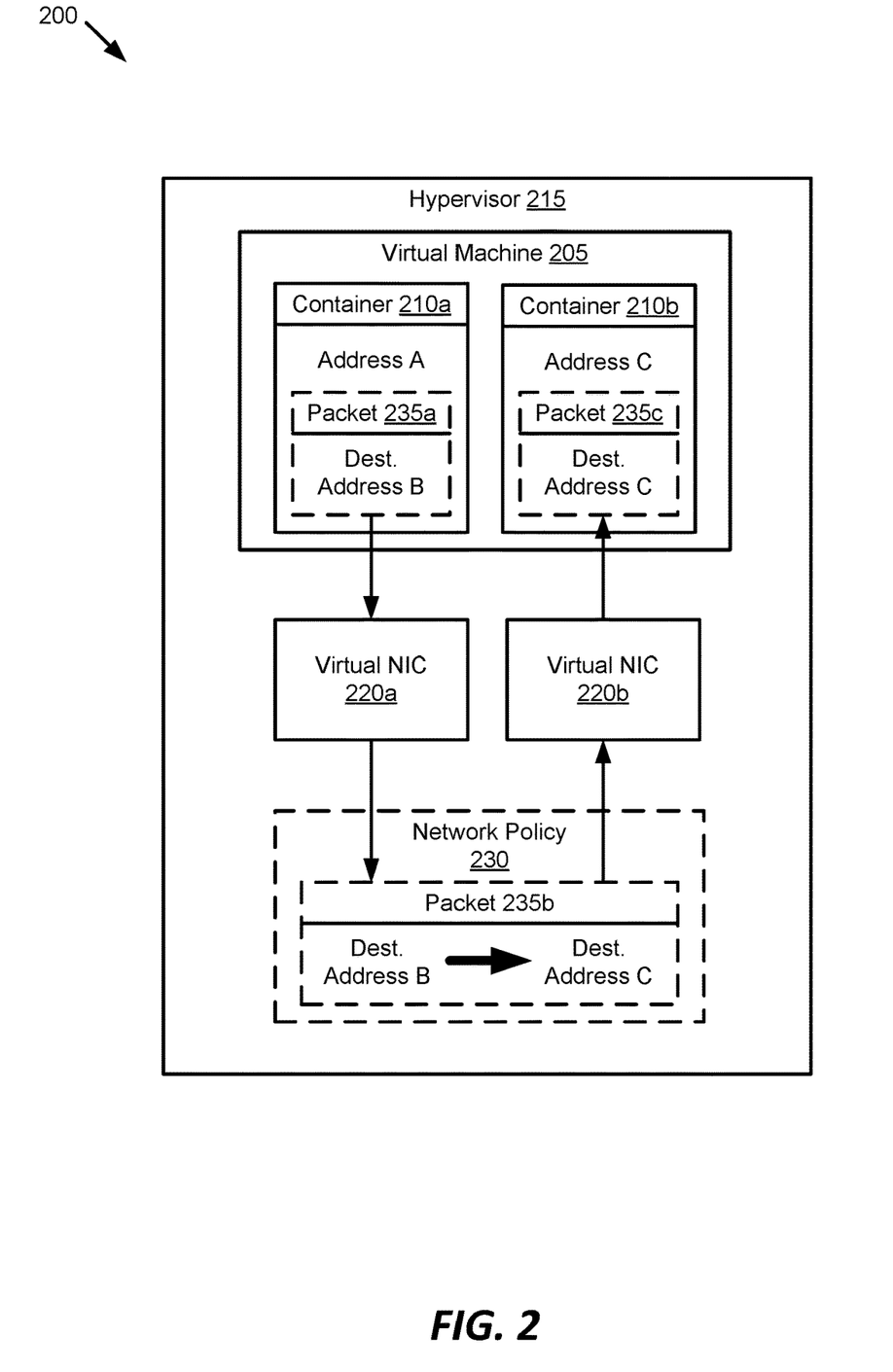
FIG. 2 is a block diagram that illustrates an example of implementing a service mesh by a hypervisor of a host system in accordance with embodiments of the disclosure.

FIG. 2 is a block diagram that illustrates an example of implementing a service mesh by a hypervisor of a host system 200 in accordance with embodiments of the disclosure. The host system may include a hypervisor 215, virtual machine 205 and containers 210*a, b*, as previously described at FIG. 1. Container 210*a* may act as an isolated execution environment for a first service of an application and have a network address of Address A. Container 210*b* may act as an isolated execution environment for a second service of the application and have a network address of Address C. In embodiments, the first service of container 210*a* and the second service of container 210*b* may use different programming languages. Container 210*a* and container 210*b* may be bridged to various network segments via virtual network interface controller (NIC) 220*a* and virtual NIC 220*b*, respectively. Virtual NICs 220*a, b* may each be abstract virtualized representations of a physical NIC of host system 200. Packets (e.g., packet 235*a*) sent from and/or received by containers 210*a, b* may be transmitted via their respective virtual NICs (e.g., virtual NICs 220*a, b*).

The host system 200 may include a network policy 230 that is stored in the host system memory (e.g., memory 170 and/or storage device 180 of FIG. 1). In some embodiments, the network policy may be stored in an area of hypervisor memory accessible by hypervisor 215. The network policy 230 may include address information, such as network address mappings, for different containers (e.g., containers 210*a, b*) that may allow hypervisor 215 to implement a service mesh and facilitate the transmission of packets between the different containers. For example, the network policy 230 may include a network address mapping that maps Address B to Address C (e.g., the network address of container 210*b*). The hypervisor 215 may utilize the address information of the network policy 230 to perform a network address translation on packets (e.g., packet 235*b*) received from the containers of host system 200. For example, if the hypervisor 215 receives packet 235*a* from container 210*a* having a destination address of Address B that is to be delivered to container 210*b*, the hypervisor 215 may utilize the address information in the network policy 230 to perform a network address translation to modify the destination address for packet 235*b* from Address B to Address C, which is the current location of container 210*b*. After performing the network address translation, the hypervisor 215 may provide packet including the modified destination address to the container. For example, after performing the network address translation to modify the destination address for packet 235*b* from Address B to Address C, the hypervisor 215 may provide the packet 235*c* to container 210*b* at Address C. Although illustrated has having a single network policy, embodiments of the disclosure may have any number of network policies that correspond to any number of containers executed by host system 200 or other host systems (not shown) operatively coupled to host system 200 via a network.

As containers are moved to new locations at new network addresses, the hypervisor 215 may modify a network policy 230 to update the network address mapping to the new network address. For example, if container 210*b* was moved to a new location at Address D, the hypervisor 215 may update the network policy 230 so that future network address translations would modify the destination address for subsequent packets from Address B and/or Address C to Address D.

In embodiments, the network policy 230 may be received from a container orchestration system. Examples of container orchestration systems may include Kubernetes™ container orchestration, Swarm™ container orchestration platform, Mesos™ container orchestration, etc. The container orchestration system may provide service mesh logic that includes one or more network policies that may be used by hypervisor 215 for implementing a service mesh. In some embodiments, the network policy 230 may be received from virtual machine 205. In an embodiment, the network policy 230 may be received from other sources.

In some embodiments, the network policy 230 may include a forwarding rule that forwards all or a portion packets from a particular container to one or more destination containers. For example, the network policy 230 may include a forwarding rule that forwards all packets from container 210*a* to container 210*b*. In another example, the network policy 230 may include a forwarding rule that forwards 90% of packets from container 210*a* to container 210*b*. Additional details regarding the implementation of a forward rule are discussed below at FIG. 4.

Figure 3:
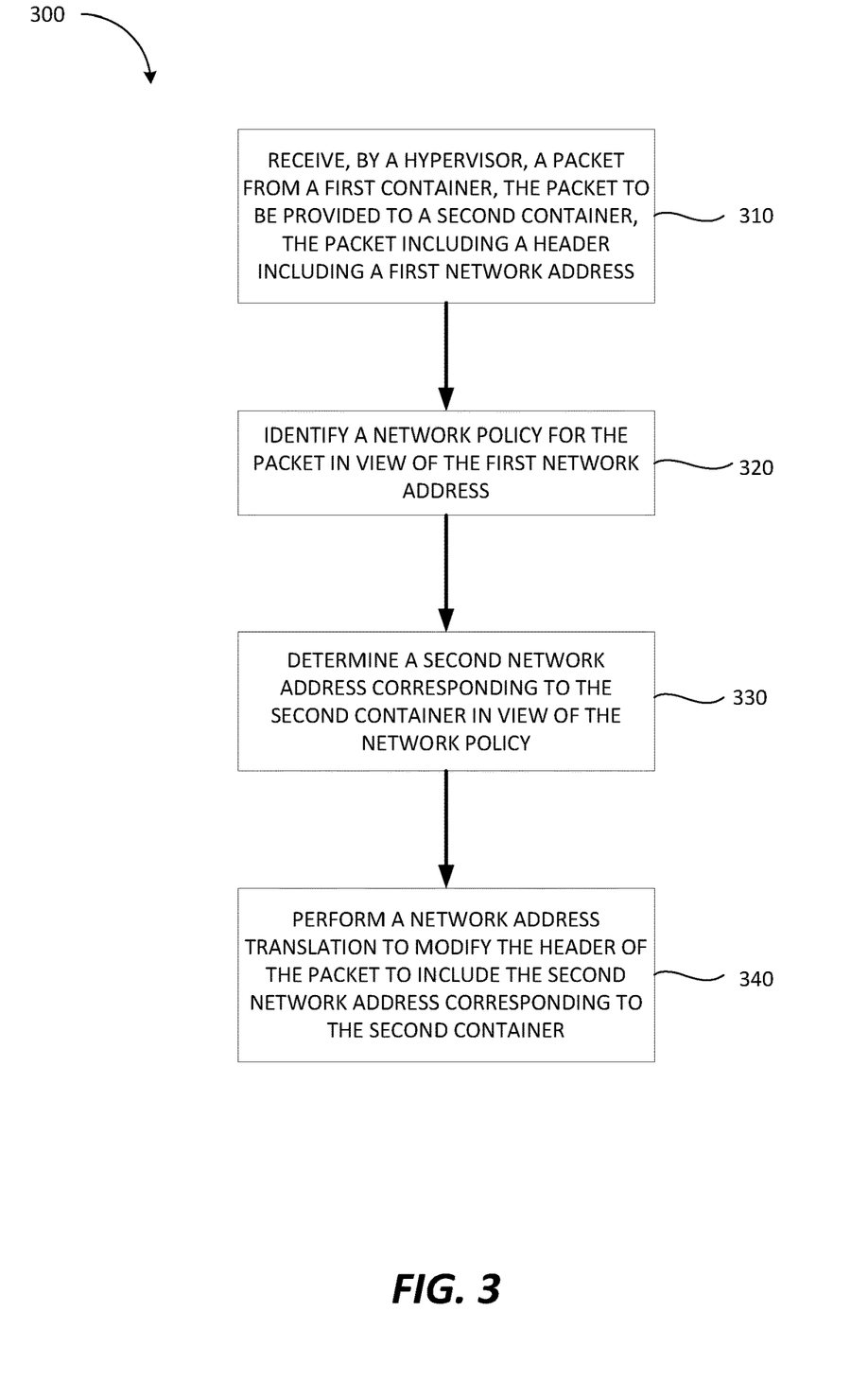
FIG. 3 is a flow diagram of a method of implementing a service mesh at the hypervisor layer, in accordance with some embodiments.

FIG. 3 is a flow diagram of a method 300 of implementing a service mesh at the hypervisor layer, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a network policy component 128 of hypervisor 125 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a packet from a first container that is to be delivered to a second container. In embodiments, the first container and the second container may reside within one or more VMs. The packet includes a header that includes a first network address corresponding to the destination network address for the packet. In embodiments, the first container may provide metadata associated with the OS of the container for use by the hypervisor.

At block 320, the processing logic identifies a network policy for the network packet in view of the first network address. As previously described, the hypervisor of the host system may receive one or more network policies from a container orchestration system that are used to implement a service mesh. The processing logic may identify a particular network policy using the first network address (e.g., the destination address) found in the header of the packet. For example, if the packet received from the first container includes a first network address that corresponds to Address B, then the processing logic may identify a network policy that corresponds to Address B.

At block 330, the processing logic determines a second network address corresponding to the second container in view of the network policy. The second network address may correspond to the current network address of the second container. For example, if the second container is located at Address C, then the second network address that corresponds to the second container is Address C.

At block 340, the processing logic performs a network address translation to modify the header of the packet to include the second network address that corresponds to the second container. For example, the processing logic may modify the header of the packet to change the destination address for the packet from Address B to Address C. In embodiments, upon performing the network address translation, the processing logic may provide the packet including the modified header to the second container.

Figure 4:
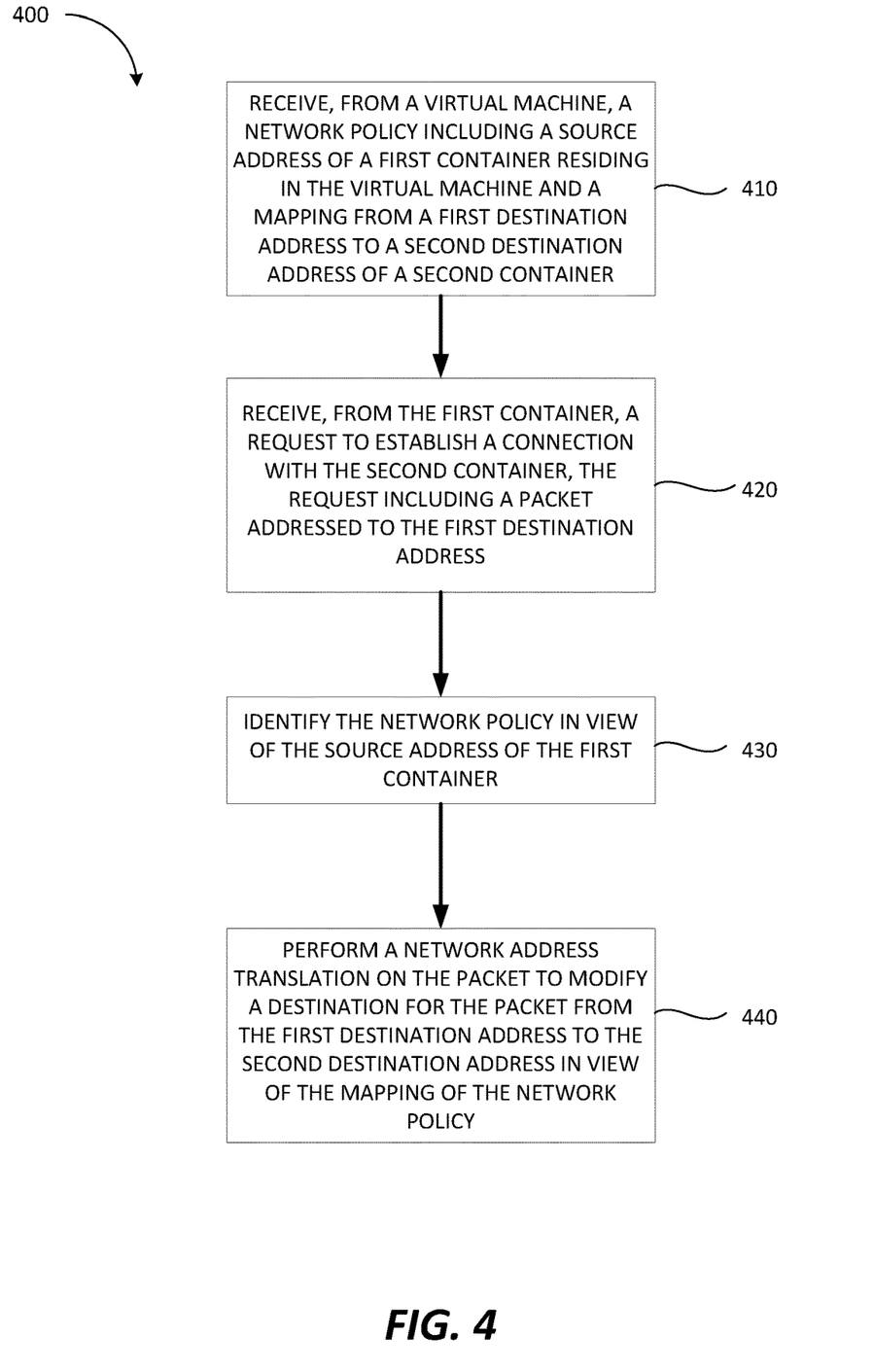
FIG. 4 is a flow diagram of a method of implementing a service mesh based on a network policy received from a virtual machine, in accordance with some embodiments.

FIG. 4 is a flow diagram of a method 400 of implementing a service mesh based on a network policy received from a virtual machine, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a network policy component 128 of hypervisor 125 of FIG. 1. In embodiments, at least a portion of method 400 may be performed by processing logic of a physical network component, such as a smart network interface controller (NIC) or smart network switch.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives, from a virtual machine, a network policy that includes a source network address (also referred to as "source address" hereafter) for a first container residing in the virtual machine and a mapping from a first destination network address (also referred to as "destination address" hereafter) to a second destination address of a second container.

At block 420, the processing logic receives, from the first container, a request to establish a connection with the second container. The request may include a packet that is addressed to the first destination address. For example, the packet may include a header that includes the first destination address for the packet.

At block 430, the processing logic identifies the network policy in view of the source address of the first container. As previously described, the network policy may include a source address that corresponds to the address of the container the packet is being sent from. For example, if the first container has a source address of Address A, then the network policy may include the source address of Address A. Accordingly, if a packet is received from the first container (at Address A), the processing logic may identify the network policy that includes a source address of Address A.

At block 440, the processing logic may perform a network address translation to modify a destination for the packet from the first destination address to the second destination address in view of the mapping of the network policy. As previously described, the network policy may include a mapping from a first destination address to a second destination address of the second container. The second destination address may correspond to the current location of the second container. For example, the network policy may include a mapping from Address B to Address C, where Address C is the current location of the second container. Accordingly, the processing logic may perform a network address translation to modify a destination for the packet from Address B to Address C. Upon performing the network address translation, the processing logic may provide the packet to the second container.

In some embodiments, receiving the network policy may cause the processing logic to install a forwarding rule for subsequent packets received from the first container. The forwarding rule may cause the processing logic to forward all or a portion of packets received from the first container to the second container by performing network address translations on the subsequent packets. The forwarding rule may be stored in memory accessible by the processing logic. For example, the forwarding rule may be stored in an area of hypervisor memory accessible by the hypervisor. In another example, the forwarding rule may be stored in memory accessible by processing logic of a physical network component, such as a smart NIC or smart network switch.

In embodiments, the processing logic may remove the forwarding rule upon detecting a disconnect by the source container. For example, if the processing logic detects a disconnect by the first container, the processing logic may remove the forwarding rule from the memory associated with the processing logic.

Figure 5:
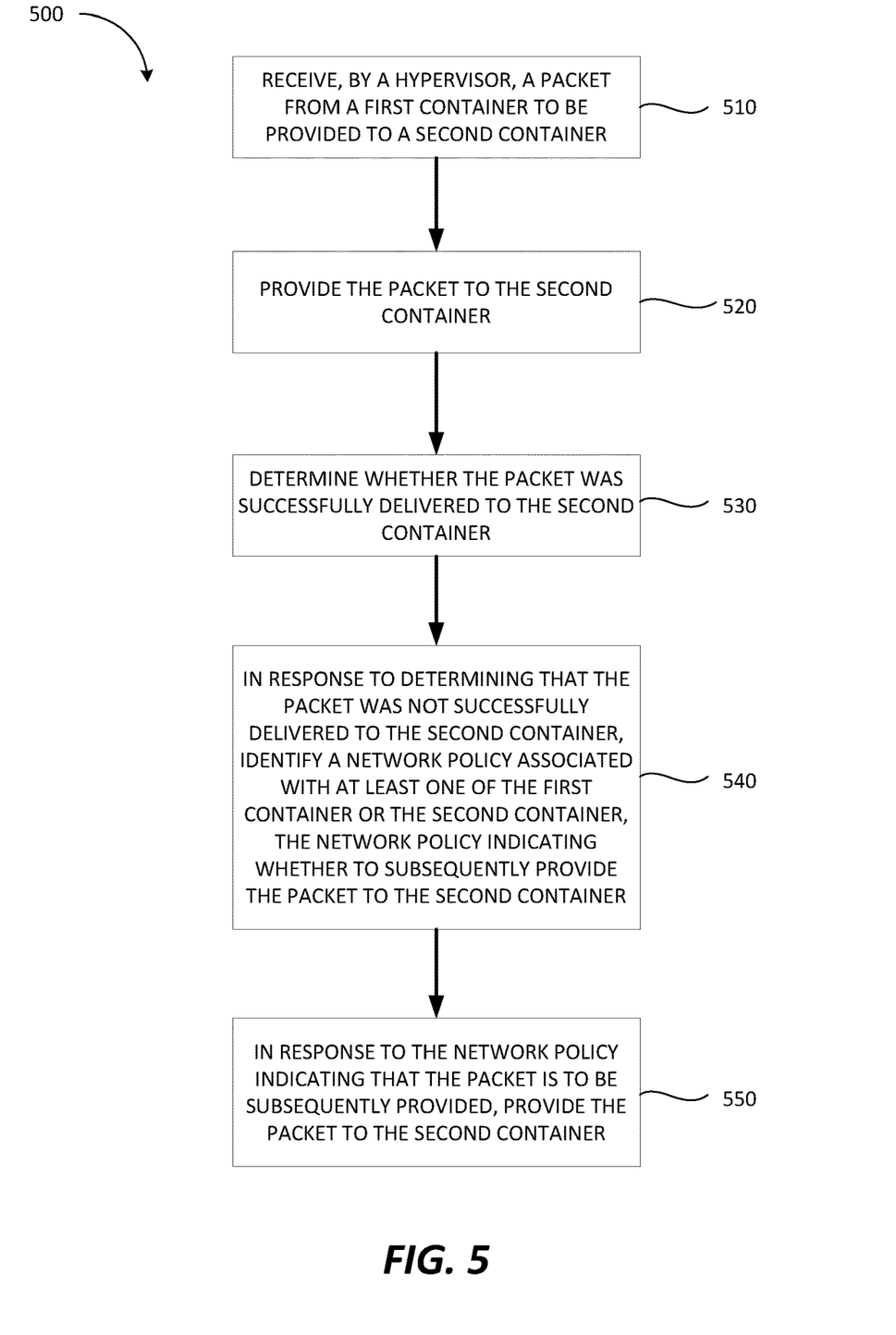
FIG. 5 is a flow diagram of a method of implementing a network policy to successfully deliver packets between containers, in accordance with some embodiments.

FIG. 5 is a flow diagram of a method 500 of implementing a network policy to successfully deliver packets between containers, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a network policy component 128 of hypervisor 125 of FIG. 1. In embodiments, at least a portion of method 500 may be performed by processing logic of a physical network component, such as a smart NIC or smart network switch.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a packet from a first container to be provided to a second container. In some embodiments, the packet may be received by a hypervisor. In embodiments, the packet may be received by a physical network component, such as a smart NIC or smart network switch.

At block 520, the processing logic provides the packet to the second container. In embodiments, the processing logic may perform a network address translation on the packet, as previously described.

At block 530, the processing logic determines whether the packet was successfully delivered to the second container. In embodiments, the processing logic may determine whether an acknowledgment that the packet was successfully delivered has been received from the second container. If the acknowledgement has been received, the processing logic determines that the packet was successfully delivered to the second container. If the acknowledgment has not been received, the processing logic determines that the packet was not successfully delivered to the second container. In embodiments, the processing logic may determine whether the packet was successfully delivered in view of the acknowledgment being received within a threshold amount of time. For example, the processing logic may determine whether the packet was successfully delivered if the acknowledgment is received within 2 seconds from the time the packet was sent.

In response to determining that the packet was not successfully delivered to the second container, at block 540 the processing logic identifies a network policy associated with at least one of the first container or the second container. The network policy may indicate whether the processing logic is to subsequently provide the packet to the second container. For example, the network policy may indicate whether the processing logic should retry sending the packet to the second container if the packet was not successfully delivered on the first attempt.

In response to the network policy indicating that the packet is to be subsequently provided, at block 550 the processing logic provides the packet to the second container. In embodiments, the network policy may indicate a number of retry attempts for providing the packet. For example, the network policy may indicate that the processing logic attempt to subsequently provide the packet to the second container 5 times. If the subsequently provided packet is successfully delivered to the second container, then the processing logic may determine to no longer subsequently provide packets to the second container. If the subsequently provided packet is not successfully delivered, the processing logic may generate an error notification and provide the error notification to the first container indicating that the packet was not successfully delivered to the second container.

Figure 6:
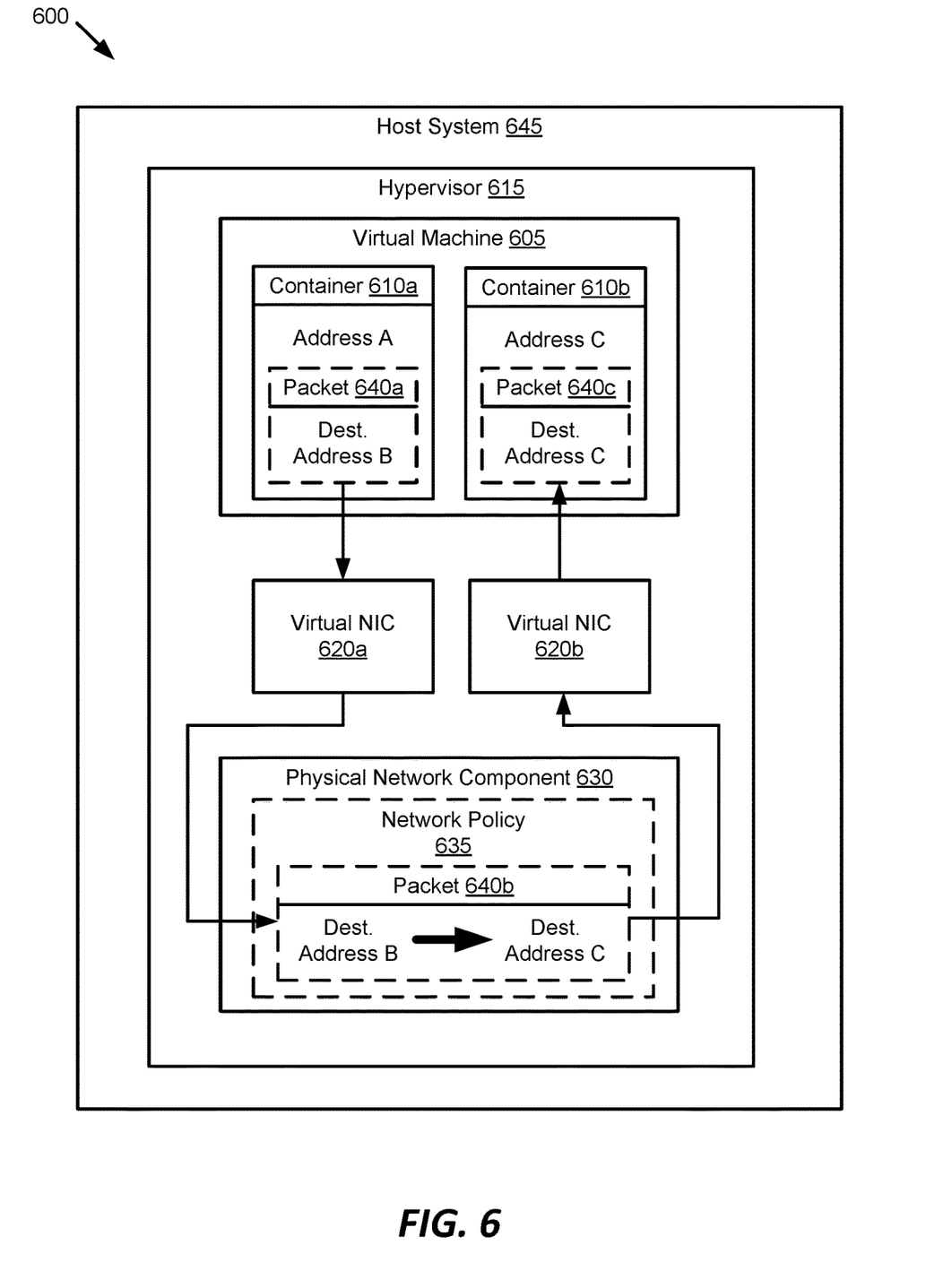
FIG. 6 is a block diagram that illustrates an example of implementing a service mesh by a physical network component of a host system in accordance with embodiments of the disclosure.

FIG. 6 is a block diagram 600 that illustrates an example of implementing a service mesh by a physical network component of a host system in accordance with embodiments of the disclosure. The host system 645 may include a hypervisor 615, virtual machine 605, containers 610a, b, virtual NICs 620a, b, network policy 635, and packets 640a-c, as previously described at FIGS. 1-5. In some embodiments, a service mesh may be implemented by a physical network component 630 of host system 645.

In embodiments, the physical network component 630 may be a smart NIC. The smart NIC may be a physical network component that routes network traffic of host system 645. In some embodiments, the smart NIC may include one or more processing devices and a memory storing one or more network policies (e.g., network policy 635). Processing logic of the one or more processing devices of the physical network component 630 may implement a service mesh between containers (e.g., container 610a and container 610b) using the one or more network policies.

In an embodiment, the physical network component 630 may be a smart network switch. A network switch may connect components on a network by using packet switching to receive and forward data to a destination component. A smart network switch may include one or more processing devices and a memory storing one or more network policies (e.g., network policy 635). Processing logic of the one or more processing devices may implement a service mesh between containers (e.g., container 610a and container 610b) using the one or more network policies. In embodiments, physical network component 630 may be any type of network component capable of implementing a service mesh to facilitate communication between containers of one or more host systems. Aspects of implementing a service mesh using a physical network component are discussed in additional detail below.

Container 610*a* and container 610*b* may be bridged to the physical network component 630 using a virtual local area network (not shown) via virtual NIC 620*a* and virtual NIC 620*b*, respectively. The physical network component may receive a packet 640*a* having a destination address of Address B that is to be delivered to container 610*b*. Upon receiving packet 640*a*, the physical network component 630 may perform a network address translation on packet 640*b* in view of the network policy 635. Upon modifying the destination address of packet 640*b* from Address B to Address C (e.g., the current location of container 610*b*), the physical network component 630 may provide packet 640*c* to container 610*b*.

Figure 7:
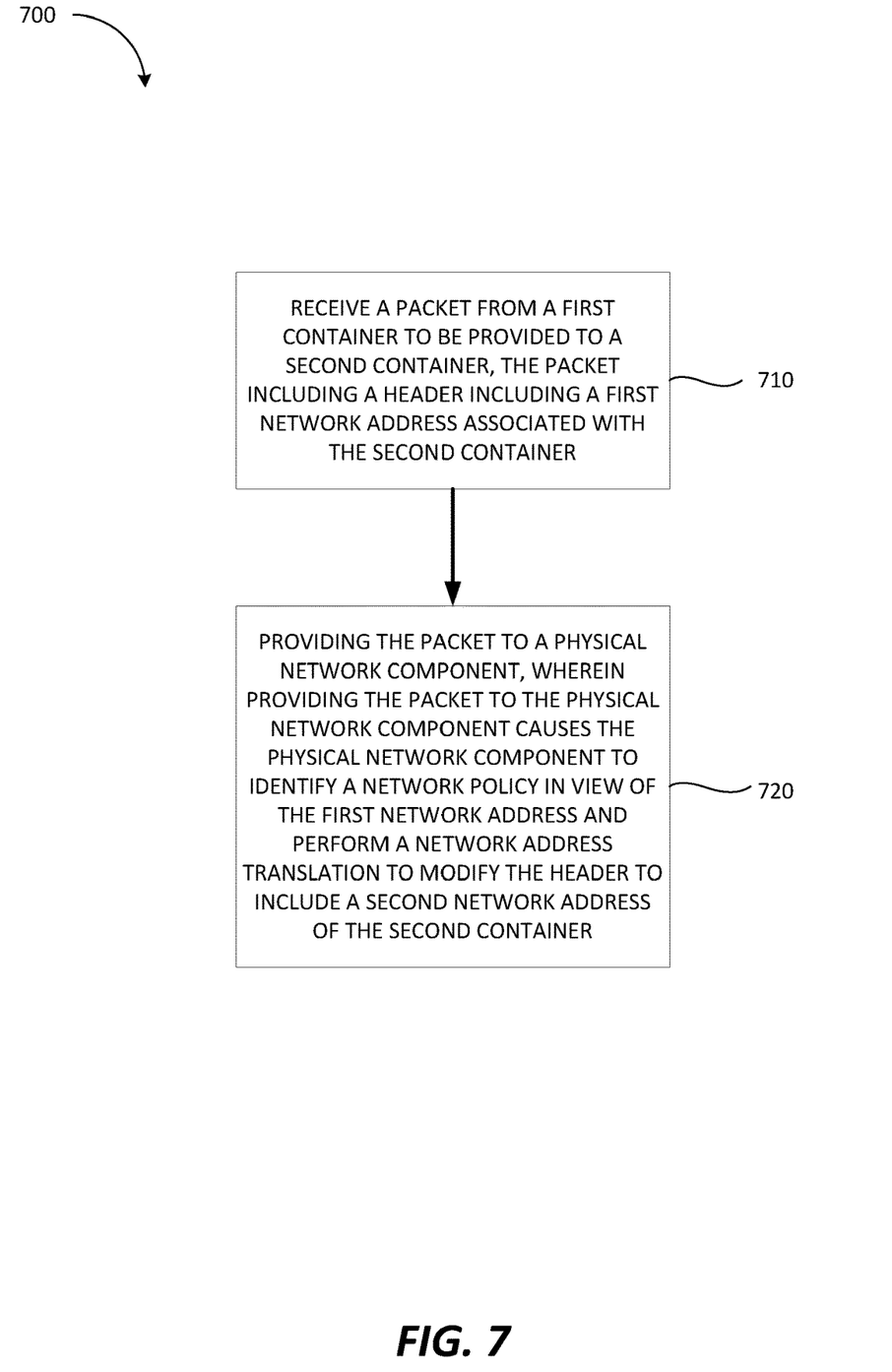
FIG. 7 is a flow diagram of a method of implementing a service mesh utilizing a physical network component, in accordance with some embodiments.

FIG. 7 is a flow diagram of a method 700 of implementing a service mesh utilizing a physical network component, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by a network policy component 128 of hypervisor 125 of FIG. 1. In embodiments, at least a portion of method 700 may be performed by processing logic of a physical network component, such as a smart NIC or smart network switch.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic receives a packet from a first container to be provided to a second container. The packet may include a header that has a first network address (e.g., a destination address) associated with the second container. For example, the packet may include a header that includes a destination address of Address B.

At block 720, the processing logic provides the packet to a physical network component. Providing the packet to the physical network component may cause the physical network component to identify a network policy in view of the first network address. For example, the processing logic may identify a network policy that includes a mapping for Address B. Providing the packet may cause the physical network component to perform a network address translation to modify the header to include a second network address of the second container. The second network address may correspond to a current location of the second container. For example, if the current location of the second container is Address C, then the second network address may be Address C. Accordingly, the physical network component may perform a network address translation to modify the header to include Address C of the second container. Upon performing the network address translation on the packet, the physical network component may provide the packet to the second container.

In some embodiments, the processing logic may tag the packet prior to providing the packet to the physical network. For example, the processing logic may tag the packet by modifying the header of the packet to include the tag. The tag may cause the physical network component to identify the corresponding network policy for the packet and perform the network address translation, as previously described.

Figure 8:
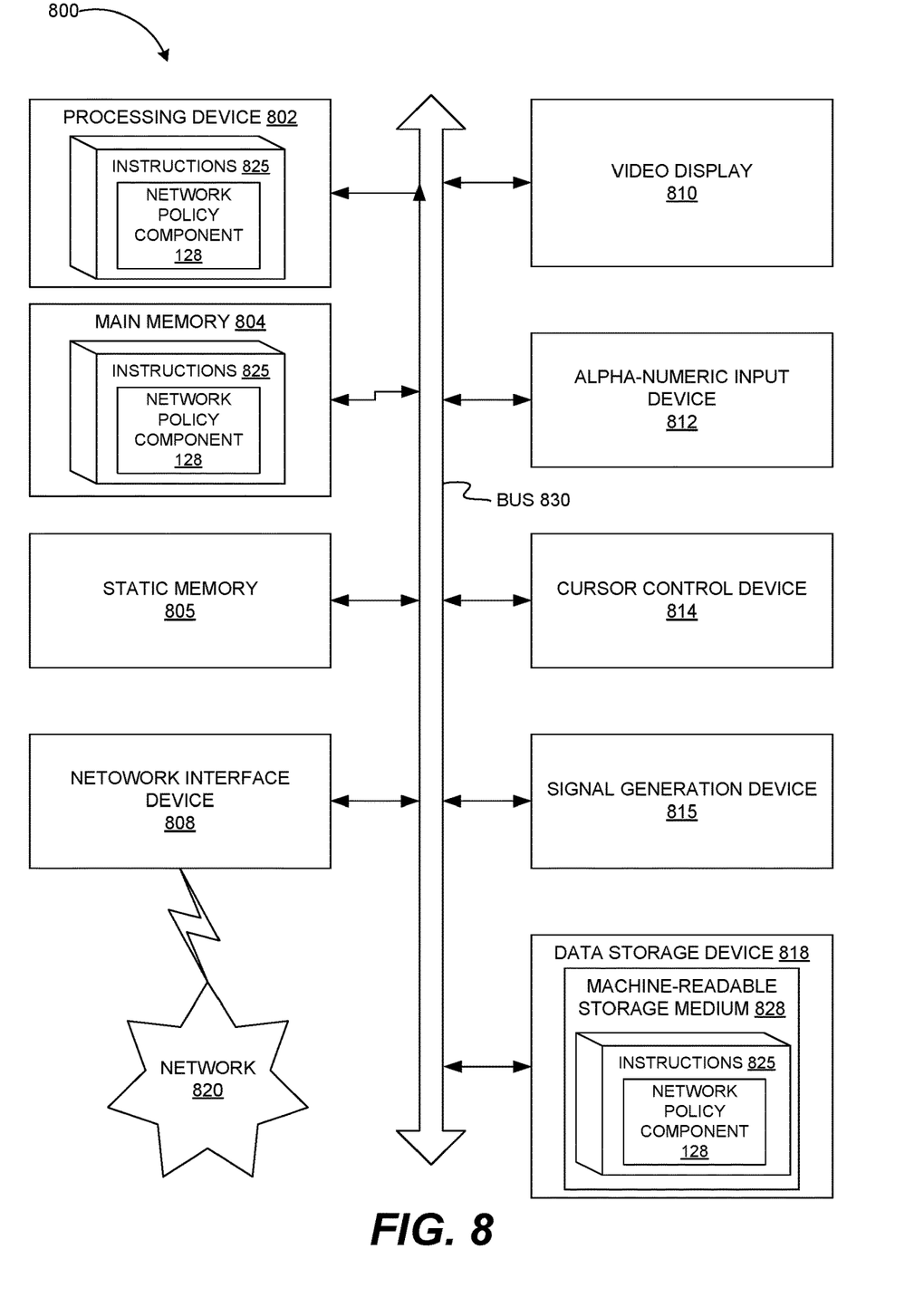
FIG. 8 is a block diagram of an example apparatus that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 512 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a network policy component, e.g., network policy component 128 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving, by a processing device executing a hypervisor, a packet from a first container, the packet to be provided to a second container, the packet comprising a header including a first network address associated with the second container; identifying, by the hypervisor, a network policy for the packet in view of the first network address; determining a second network address corresponding to the second container in view of the network policy; and performing, by the hypervisor, a network address translation to modify the header of the packet to include the second network address corresponding to the second container.

Example 2 is the method of Example 1, further comprising: providing the packet to the second container at the second network address of the modified header.

Example 3 is the method of Example 2, wherein the packet is received from a first service executing in the first container and provided to a second service executing in the second container, wherein the first service uses a first programming language and the second service uses a second programming language that is different than the first programming language.

Example 4 is the method of Example 1, wherein the network policy is received from a container orchestration system.

Example 5 is the method of Example 1, wherein the first container and the second container reside within one or more virtual machines.

Example 6 is the method of Example 1, wherein identifying the network policy for the packet in view of the first network address comprises: identifying a plurality of network policies, each of the plurality of network policies having a corresponding network address; and identifying the network policy from the plurality of network policies in view of the corresponding network address of the network policy matching the first network address.

Example 7 is the method of Example 1, wherein the packet is received from the first container by the hypervisor via a virtual network interface card.

Example 8 is the method of Example 1, wherein the network policy correlates the first network address received from the first container with the second network address corresponding to a location of the second container.

Example 9 is a system comprising: a memory; and a processing device, operatively coupled to the memory, to: receive, by a hypervisor, a packet from a first container to be provided to a second container; provide the packet to the second container; in response to determining that the packet was not successfully delivered to the second container, identify a network policy associated with at least one of the first container or the second container, the network policy indicating whether to subsequently provide the packet to the second container; and in response to the network policy indicating that the packet is to be subsequently provided, provide the packet to the second container.

Example 10 is the system of Example 9, wherein the processing device is further to: perform a network address translation to modify a header of the packet to include a network address corresponding to the second container, wherein the processing device is to provide the packet comprising the modified header to the second container in response to performing the network address translation.

Example 11 is the system of Example 9, wherein to determine whether the packet was successfully delivered to the second container, the processing device is further to: receive, from the second container, an indication that the delivery of the packet was unsuccessful.

Example 12 is the system of Example 9, wherein the network policy indicates a threshold number of times the packet is to be subsequently provided to the second container.

Example 13 is the system of Example 12, wherein the processing device is further to: determine whether a number of times the packet has been subsequently provided to the second container satisfies the threshold number of times indicated by the network policy; and in response to determining that the number of times the packet has been subsequently provided satisfies the threshold number of times, determine to not subsequently provide the packet to the second container.

Example 14 is the system of Example 9, wherein the packet is received from a first application executing in the first container and provided to a second application executing in the second container, wherein the first application uses a first programming language and the second application uses a second programming language that is different than the first programming language.

Example 15 is the system of Example 9, wherein the first container and the second container reside within one or more virtual machines.

Example 16 is a non-transitory computer-readable storage medium including instructions that, when executed by a processing device, cause the processing device to: receive, from a virtual machine, a network policy comprising a source address of a first container residing in the virtual machine and a mapping from a first destination address to a second destination address of a second container; receive, from the first container, a request to establish a connection, the request comprising a packet addressed to the first destination address; identify the network policy in view of the source address of the first container; and perform, by the processing device, a network address translation on the packet to modify a destination for the packet from the first destination address to the second destination address in view of the mapping of the network policy.

Example 17 is the non-transitory computer-readable storage medium of Example 16, wherein the processing device is further to: provide the packet to the second container at the second destination addresses.

Example 18 is the non-transitory computer-readable storage medium of Example 16, wherein the processing device is further to: install a forwarding rule to a memory associated with the processing device, the forwarding rule to cause the processing device to perform the network address translation on subsequent packets received from the first container.

Example 19 is the non-transitory computer-readable storage medium of Example 18, wherein the processing device is further to: detect a disconnect by the first container; and remove the forwarding rule from the memory associated with the processing device.

Example 20 is the non-transitory computer-readable storage medium of Example 16, wherein the processing device is executing a hypervisor.

Example 21 is the non-transitory computer-readable storage medium of Example 16, wherein the processing device is operatively coupled to a physical network component.

Example 22 is a method comprising: receiving, by a processing device, a packet from a first container to be provided to a second container, the packet comprising a header including a first network address associated with the second container; and providing the packet to a physical network component, wherein providing the packet to the physical network component causes the physical network component to identify a network policy in view of the first network address and perform a network address translation to modify the header to include a second network address of the second container.

Example 23 is the method of Example 22, wherein the physical network component comprises at least one of a smart network interface card of a smart network switch.

Example 24 is the method of Example 22, wherein providing the packet to the physical network component further causes the physical network component to provide the packet to the second container upon performing the network address translation.

Example 25 is the method of Example 22, wherein the packet is provided to the physical network component via a virtual local area network.

Example 26 is the method of Example 22, further comprising: tagging the packet to indicate that the packet is to be processed by the physical network component, wherein the tag causes the physical network component to identify the network policy.

Example 27 is the method of claim 22, wherein the packet is received from a first service executing in the first container and provided to a second service executing in the second container, wherein the first service uses a first programming language and the second service uses a second programming language that is different than the first programming language.

Example 28 is the method of Example 22, wherein the first container and the second container reside within one or more virtual machines.

Example 29 is an apparatus comprising: means for receiving a packet from a first container, the packet to be provided to a second container, the packet comprising a header including a first network address associated with the second container; means for identifying a network policy for the packet in view of the first network address; means for determining a second network address corresponding to the second container in view of the network policy; and means for performing a network address translation to modify the header of the packet to include the second network address corresponding to the second container.

Example 30 is the apparatus of Example 29, further comprising: means for providing the packet to the second container at the second address of the modified header.

Example 31 is the apparatus of Example 30, wherein the packet is received from a first service executing in the first container and provided to a second service executing in the second container, wherein the first service uses a first programming language and the second service uses a second programming language that is different than the first programming language.

Example 32 is the apparatus of Example 29, wherein the network policy is defined in view of a service mesh controlling communication between the first container and the second container.

Example 33 is the apparatus of Example 29, wherein the first container and the second container reside within one or more virtual machines.

Example 34 is the apparatus of Example 29, wherein the means for identifying the network policy for the packet in view of the first network address comprises: means for identifying a plurality of network policies, each of the plurality of network policies having a corresponding network address; and means for identifying the network policy from the plurality of network policies in view of the corresponding network address of the network policy matching the first network address.

Example 35 is the apparatus of Example 29, wherein the packet is received from the first container via a virtual network interface card.

Example 36 is the apparatus of Example 29, wherein the network policy correlates the first network address received from the first container with the second network address corresponding to a location of the second container.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, by a processing device executing a hypervisor, a packet from a first container, wherein the packet comprises a header including a first network address associated with a second container having a current location at a second network address, and wherein the first container and the second container reside within a same virtual machine;
identifying, by the hypervisor, a network policy comprising a mapping between the first network address and the second network address;
performing, by the hypervisor and based on the network policy, a network address translation to modify the header of the packet to include the second network address corresponding to the second container; and
in response to the second container moving to a new location at a third network address, modifying the network policy to map the first network address to the third network address,
wherein identifying the network policy comprises identifying the network policy from a plurality of network policies, each of the plurality of network policies having a corresponding network address, and
wherein the network policy indicates a threshold number of times the packet is to be subsequently provided to the second container.

2. The method of claim 1, further comprising:
providing the packet to the second container at the second network address of the modified header.

3. The method of claim 2, wherein the packet is received from a first service executing in the first container and provided to a second service executing in the second container, wherein the first service uses a first programming language and the second service uses a second programming language that is different than the first programming language.

4. The method of claim 1, further comprising: receiving the network policy from the container orchestration system.

5. The method of claim 1, wherein identifying the network policy comprises:
identifying the network policy from the plurality of network policies in view of the corresponding network address of the network policy matching the first network address.

6. The method of claim 1, wherein the network policy correlates the first network address received from the first container with the second network address corresponding to the current location of the second container.

7. A system comprising:
a memory; and
a processing device, operatively coupled to the memory, to:
receive, by a hypervisor, a packet from a first container, wherein the packet comprises a header including a first network address associated with a second container having a current location at a second network address, and wherein the first container and the second container reside within a same virtual machine;
identify, by the hypervisor, a network policy comprising a mapping between the first network address and the second network address;
perform, by the hypervisor and based on the network policy, a network address translation to modify the header of the packet to include the second network address corresponding to the second container; and in response to the second container moving to a new location at a third network address, modify the network policy to map the first network address to the third network address, wherein, to identify the network policy, the processing device is to identify a plurality of network policies, each of the plurality of network policies having a corresponding network address, and wherein the network policy indicates a threshold number of times the packet is to be subsequently provided to the second container.

8. The system of claim 7, wherein the processing device is further to:

provide the packet to the second container; and determine whether the packet has been successfully delivered to the second container.

9. The system of claim 7, wherein to determine whether the packet was successfully delivered to the second container, the processing device is further to:

receive, from the second container, an indication that the delivery of the packet was unsuccessful.

10. The system of claim 9, wherein the processing device is further to:

determine whether a number of times the packet has been subsequently provided to the second container satisfies the threshold number of times indicated by the network policy; and in response to determining that the number of times the packet has been subsequently provided satisfies the threshold number of times, determine to not subsequently provide the packet to the second container.

11. The system of claim 7, wherein the packet is received from a first application executing in the first container and provided to a second application executing in the second container, wherein the first application uses a first programming language and the second application uses a second programming language that is different than the first programming language.

12. A non-transitory computer-readable storage medium including instructions that, when executed by a processing device, cause the processing device to:

receive, by a hypervisor, a packet from a first container, wherein the packet comprises a header including a first network address associated with a second container having a current location at a second network address, and wherein the first container and the second container reside within a same virtual machine;

identify, by the hypervisor, a network policy comprising a mapping between the first network address and the second network address;

perform, by the processing device running the hypervisor and based on the network policy, a network address translation to modify the header for the packet to include the second network address; and in response to the second container moving to a new location at a third network address, modify the network policy to map the first network address to the third network address, wherein, to identify the network policy, the instructions cause the processing device to identify a plurality of network policies, each of the plurality of network policies having a corresponding network address, and wherein the network policy indicates a threshold number of times the packet is to be subsequently provided to the second container.

13. The non-transitory computer-readable storage medium of claim 12, wherein the instructions further cause the processing device to:

provide the packet to the second container at the second destination addresses.

14. The non-transitory computer-readable storage medium of claim 12, wherein the instructions further cause the processing device to:

install a forwarding rule to a memory associated with the processing device, the forwarding rule to cause the processing device to perform the network address translation on subsequent packets received from the first container.

15. The non-transitory computer-readable storage medium of claim 14, wherein the instructions further cause the processing device to:

detect a disconnect by the first container; and remove the forwarding rule from the memory associated with the processing device.

\* \* \* \* \*